…

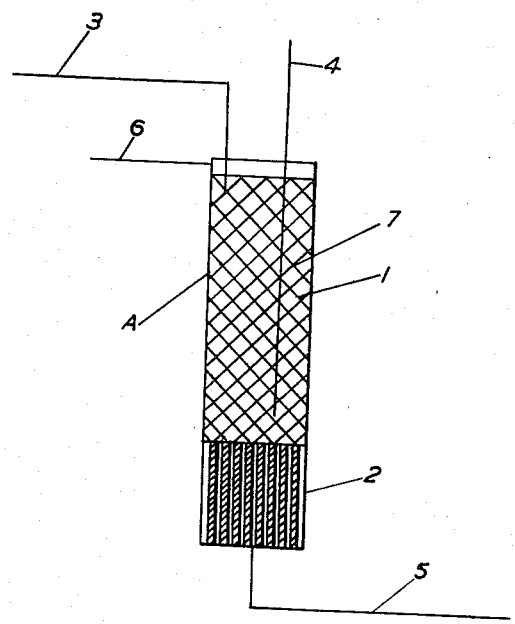

United States Patent Office 2,723,998
Patented Nov. 15, 1955

2,723,998
PRODUCTION OF ORGANIC OXYGEN-CONTAINING COMPOUNDS

Arthur William Charles Taylor and John Burnard Harding, Norton-on-Tees, England, assignors to Imperial Chemical Industries Limited, a corporation of Great Britain Application August 20, 1951, Serial No. 242,772

Claims priority, application Great Britain September 5, 1950

6 Claims. (Cl. 260—604)

This invention relates to the production of oxygen-containing compounds by a process of carbonylation.

It is well known to produce oxygen-containing compounds, in particular aldehydes, by reacting olefinic compounds, especially aliphatic mono-olefines containing up to 18 carbon atoms in the molecule with carbon monoxide and hydrogen in the liquid phase under superatmospheric temperature and pressure, using cobalt as catalyst, preferably in dissolved form, e. g., as the salt of an organic acid, or as carbonyl or hydrocarbonyl.

To avoid deterioration of the aldehydic product or to prevent interference with other processes by which the product is treated it is commonly desirable to remove the cobalt from the product. Removal of cobalt becomes especially important when the said product is hydrogenated subsequently to alcohol, for example using a copper on chromia or copper on zinc oxide catalyst, since residual cobalt carbonyl would interfere with the hydrogenation step. Moreover, cobalt is expensive and its recovery is highly desirable for reasons of cost. A method for cobalt recovery employing reduction of the carbonylation product with hydrogen to precipitate cobalt metal, which is then filtered off, has been disclosed. Moreover, a process in which the cobalt after precipitation in this manner is separated by application of a magnetic field, e. g., by permanent magnets or by electromagnets has been disclosed in the accompanying drawing.

We have found that, in processes in which the cobalt is thus precipitated and separated, it can be readily, economically and efficiently regenerated for re-use in the carbonylation stage by treatment with a solution of carbon monoxide, or carbon monoxide and hydrogen, in the liquid olefine, or part thereof, before the latter is fed to the carbonylation stage, or in any inert medium used in the carbonylation stage, for instance when the starting material comprises olefines which are gaseous under the carbonylation reaction conditions, e. g., ethylene or propylene.

According to the present invention there is provided a process for the conversion to oxygen-containing organic compounds of olefines by means of carbon monoxide and hydrogen in the liquid phase under superatmospheric temperature and pressure in the presence as catalyst of cobalt or a cobalt compound in which subsequently to the conversion the cobalt is precipitated from the solution as metallic cobalt and separated therefrom on supporting elements characterised in that the metallic cobalt disposed on the supports is subsequently converted into active catalytic form suitable for re-use in the main conversion by bringing into contact with it, while disposed on the said support, a substantially single phase comprising a solution of carbon monoxide, or of carbon monoxide and hydrogen, in a liquid under conditions of elevated temperature and pressure, whereby a solution of cobalt carbonyl or/and cobalt hydrocarbonyl is formed.

Preferably the dissolving agent is completely single phase, that is a solution of gas in liquid, and no gas phase is present.

The process may be conducted, for example, in the following manner. The cobalt is precipitated from the reaction product by lowering the partial pressure of carbon monoxide therein, e. g., by treatment with hydrogen, the precipitated cobalt metal is deposited, collected or separated e. g., by a filter or by magnetic means, the separated cobalt is treated with a solution of carbon monoxide or carbon monoxide and hydrogen, in some at least of the liquid to be fed to the carbonylation stage, which may comprise olefine or inert medium, whereby there is obtained a solution of cobalt carbonyl or hydrocarbonyl, and this solution is passed to the carbonylation stage.

Preferably the precipitation is effected by means of hydrogen, and preferably also the cobalt is separated by magnetic means: the magnets or magnet then form the supporting elements.

The process of the invention may, for example, be conducted in the manner to be now described by reference to the accompanying drawing which is a schematic representation of a suitable arrangement of apparatus. A represents one of two exactly similar vessels, preferably copper lined, or of stainless steel, each having a solution zone 1, which preferably is packed, e. g., with grid packing, especially of egg-crate type, and a separation zone 2, the latter preferably comprising a number of permanent magnets.

These magnets may, for example, be situated in a series of trays or frames, it being arranged that the number of magnets per tray or frame increases progressively in the direction of flow of the liquid. Alternatively the field strength may be increased by using progressively stronger magnets. One very suitable type of magnet comprises a string of cylindrical magnets threaded on a non-magnetic rod, each magnetic element being separated from its neighbours by a cylinder of non-magnetic material, e. g., brass. Spiders may be provided at suitable intervals on the rod for locating it in the containing vessel.

Alternatively, magnetic filters of commercial type may be employed.

When operating as shown in the drawing, vessel A is employed in stripping dissolved carbon monoxide from the carbonylation product, and removing cobalt metal, while the other similar vessel is employed on regeneration of cobalt as a solution of carbonyl or hydrocarbonyl in the feed for the carbonylation reactor in the manner hereinafter described. The carbonylation product to be treated according to the process is fed in continuously by the line 3 and hydrogen (96% pure) comprising the greater part of the make-up for the carbonylation stage is introduced continuously by the line 4 and passed up the zone 1 countercurrently to the carbonylation product. The resulting gaseous mixture of CO and H₂ is removed by the line 6 and returned to the carbonylation reactor.

The stripped product from zone 1 containing suspended cobalt particles then passes through the magnetic separation zone 2, and thence by the line 5 to a vaporiser (not shown) prior to being passed to the hydrogenation section for conversion to alcohol. This cycle is continued until the magnets are almost saturated with cobalt metal, which may take place, for example, over a period of 4 hours. By means of a suitable arrangement of valves vessel A is switched over to regeneration of cobalt in solution, and the second vessel to stripping with hydrogen.

The regeneration of the cobalt trapped in 2 is effected by pumping some of the liquid fed to the carbonylation stage through the line 3 and carbon monoxide and hydrogen counter-currently to the liquid through the line 4 and out by 6. Solution of the carbon monoxide and hydrogen in the liquid takes place in the zone 1, and in one form of the invention the liquid becomes saturated with respect to them. The saturated liquid passes through the magnetic separator and there dissolves the cobalt as cobalt carbonyl or hydrocarbonyl and the resulting solution is then recycled to the carbonylation stage. At the commencement of the cobalt regeneration cycle it is found desirable to employ a carbon monoxide/hydrogen mixture having the molar composition 1:1 in order to avoid too rapid reaction between the carbon monoxide and cobalt, although lower ratios may be used if desired. If such rapid reaction occurred the temperature would rise with consequent tendency for deposition of cobalt on the magnets and in the vessel. After the initial stage of regeneration, the proportion of carbon monoxide is gradually increased to saturate the liquid and remove the last traces of cobalt.

If desired the solution and filtration zones may be separated from one another by a partition.

Magnetic separation is preferred to ordinary filtration.

The carbonylation process is conducted at, for example 100° to 180° C. and a pressure of 150 to 300, but preferably at least 200, atmospheres gauge. Preferably regeneration according to the process of the invention is conducted at 140° C. to 160° C. because this favours cobalt carbonyl formation. Regeneration is conducted suitably at 150 to 300 atmospheres gauge.

The present invention finds its most valuable application in processes where catalyst is introduced to the carbonylation stage as a soluble organic cobalt compound and not as cobalt metal or alloy. The advantage of such processes is that control of catalyst concentration is improved; that in contrast to catalyst suspensions the reaction material can be easily pumped, erosion of valves is considerably reduced and choking of lines can be substantially eliminated; and that in contrast to the use of massive cobalt the active catalyst can be more rapidly formed. The special advantage of the present invention in such processes is that accurate control of the catalyst concentration in the main carbonylation zone is achieved by its use, and, therefore, better control of the main reaction can be maintained.

Suitable cobalt catalysts are soluble cobalt salts such as the acetate, naphthenate, hexoate, which are dissolved in the feed.

Preferably in the process of this invention the solution of carbon monoxide in the liquid contains a restricted amount of carbon monoxide, which most frequently will be less than that required to saturate the liquid when the regeneration is conducted at 250 atmospheres gauge. The reasons for preferring this procedure are that: when carbon monoxide alone is reacted with cobalt metal at 150° C., solid cobalt carbonyl is formed on the metal surface, resulting in increasingly slow reaction, but the use of carbon monoxide in solution by removing this layer permits further attack; in this manner better control of cobalt carbonyl generation is achieved, wherefore cobalt can be regenerated at a rate in step with the requirement for the carbonylation stage; the solution of cobalt carbonyl is not saturated and therefore deposition, which would cause choking, is prevented; and the concentration of carbon monoxide in the solution can be progressively increased as the amount of cobalt on the magnets decreases, thus facilitating a steady evolution of cobalt carbonyl.

A good method of preparing a regenerating liquid obtaining a desired concentration of carbon monoxide is to mix a saturated or concentrated solution of carbon monoxide in liquid with liquid comprising a dilute solution of, or containing no, carbon monoxide. Conveniently this can be done by introducing more liquid at a point below the point of entry of the CO to the solution zone. This provides a simple and very effective method of controlling accurately the concentration of carbon monoxide in the solution in the regeneration stage, which is exothermic and highly sensitive to CO concentration.

The desirability of operating within a narrow range of conditions and with an unsaturated solution of carbon monoxide is well brought out by the following typical data we have obtained with diisobutene. The solubility of carbon monoxide in di-isobutene increases with temperature: thus at 250 atmospheres gauge, it is 70 litres/litre at 20° C. and 132 litres/litre at 140° C., corresponding respectively to 6% and 12% by weight of cobalt in solution as carbonyl. Since the actual solubility of cobalt carbonyl in di-isobutene is equivalent to only about 6.0% by weight of cobalt at 20° C. and somewhat more at higher temperatures, it follows that the use of a saturated solution of carbon monoxide at the temperature needed for carbonyl formation would give rise to a solution which is supersaturated at lower temperatures and would therefore deposit solid cobalt carbonyl, with resulting choking of the apparatus and pipe lines. Moreover, we have found that the rate of cobalt carbonyl generation is not easily controlled by controlling the temperature per se, whatever the saturation, nor can it be satisfactorily controlled by varying the rate of flow of the solvent.

The use of a solution of carbon monoxide or carbon monoxide and hydrogen has the additional advantages that by using a solution not saturated with respect to cobalt carbonyls the lines can be kept clean. Moreover, the solution can be used to cleanse the lines of cobalt as well as to regenerate cobalt on the magnets.

Among suitable olefine compounds that can be treated according to the process of the invention are, for example, di-isobutene, ethylene, propene, cyclohexene, cracked wax olefines. Suitable liquids for use as the regenerating solution are: di-isobutene, iso-octane, alcohols such as nonanol, ethers such as dinonyl ether, and the heavy ends obtained after hydrogenating the oxo alcohols. The four last mentioned types of compounds are preferred because of their inactive behaviour in the carbonylation and hydrogenation steps.

When an auxiliary liquid, which is an olefine, is used for dissolving the cobalt regenerated as carbonyl, it is desirable that it should be one which has a carbonylation activity of similar order to the olefine which is being treated in the main process.

It is preferred to employ for the regenerating solution a liquid which is of such a character that if inert itself it boils, or if active its product boils, at least 50° C. above or below the boiling point at N. T. P. of the alcohol product, since this facilitates separation of the product and does away with the need for an additional still.

The process of the invention is illustrated by the following example.

*Example*

Reduced cobalt metal attached to the magnets of a magnetic separator was treated at 250 atmospheres gauge with di-isobutene containing 83 litres of carbon monoxide per litre and at a liquid space velocity of 8 litres per litre of free space per hour at 140° C., and there was obtained an effluent solution containing cobalt carbonyl equivalent to 3.4% of cobalt.

In contrast to this, when an excess of carbon monoxide was employed the concentration of cobalt in the effluent solution exceeded the carbonyl saturation value of 6.0% by weight of cobalt at 20° C. and severe choking of the cooler parts of the equipment by deposition of solid carbonyl took place.

As already indicated the process of regeneration may be conducted with a solution which is saturated with carbon monoxide or, preferably, which is unsaturated with respect to carbon monoxide. The solution may also be free from hydrogen, or may be unsaturated with respect to hydrogen, or saturated with respect to hydrogen, under the conditions employed. Preferably in all these variants the partial pressure of carbon monoxide employed in the regeneration process is at least 50 atmospheres gauge.

We claim:

1. A process for the production of organic oxygen-containing compounds according to the Oxo synthesis which comprises reacting in a synthesis zone olefinic compounds with carbon monoxide and hydrogen in the liquid phase under elevated temperature and pressure in the presence of a cobalt catalyst substantially entirely in solution, precipitating cobalt metal from the liquid product so produced by reducing the partial pressure of carbon monoxide over it, continuously separating from the liquid the precipitated cobalt metal by causing the liquid to flow in a thin layer over magnetic surfaces immersed in the liquid in one of two magnetic separating units placed in parallel, and continuously regenerating cobalt metal previously separated onto similar surfaces in the other unit in active catalytic form suitable for return to the Oxo synthesis zone by treatment with a substantially single liquid phase comprising an organic solution containing carbon monoxide and unsaturated with respect to the latter while immersed therein at 140° to 160° C. under a partial pressure of at least 50 atmospheres of carbon monoxide and the resulting unsaturated solution of cobalt carbonyl compound is continuously passed to the Oxo synthesis zone, the pressure in the Oxo synthesis zone and in the aforesaid two units being substantially the same.

2. A process as recited in claim 1 in which the substantially single liquid phase comprises a solution of carbon monoxide and hydrogen which is not saturated with respect to these gases under the conditions of treatment.

3. A process as recited in claim 1 in which the substantially single liquid phase which is unsaturated with respect to carbon monoxide is formed by first preparing a concentrated solution of carbon monoxide in the liquid and thereafter diluting the concentrated solution with further liquid which does not contain carbon monoxide in substantial quantity.

4. A process as recited in claim 1 in which the substantially single liquid phase comprises a solution of carbon monoxide and hydrogen in which the molar ratio of carbon monoxide to hydrogen in the solution at the commencement of regeneration is substantially 1:1, said molar ratio being increased above 1:1 subsequently in the regeneration.

5. A process as recited in claim 1 in which the solvent employed in the substantially single liquid phase solution is inert and has a boiling point at normal temperature and pressure at least 50° C. removed from that of the alcohol obtained by the hydrogenation of the aldehyde product of the main synthesis.

6. A continuous process for the production of cobalt carbonyl and cobalt hydrocarbonyl at accurately controlled rates without danger of the formation of a supersaturated solution which will cause deposition of solid cobalt carbonyl at lower temperatures which comprises treating finely divided metallic cobalt upon supporting elements by immersing said cobalt while upon said supports in a substantially single liquid phase comprising a hydrocarbon liquid which is a solvent for cobalt carbonyl and hydrocarbonyl containing carbon monoxide in solution at 140° to 160° C. under a partial pressure of at least 50 atmospheres of carbon monoxide, said liquid hydrocarbon being unsaturated with respect to the carbon monoxide dissolved therein, and containing hydrogen when it is desired to produce cobalt hydrocarbonyl.

References Cited in the file of this patent

UNITED STATES PATENTS

| | | |
|---|---|---|
| 1,390,688 | Ellis | Sept. 13, 1921 |
| 1,759,661 | Muller et al. | May 20, 1930 |
| 2,264,756 | Johnston, Jr. | Dec. 2, 1941 |
| 2,358,612 | Acker | Sept. 19, 1944 |
| 2,477,554 | McKeever | July 26, 1949 |
| 2,504,682 | Harlan, Jr. | Apr. 18, 1950 |
| 2,508,666 | Frantz | May 23, 1950 |
| 2,571,160 | Parker et al. | Oct. 16, 1951 |
| 2,587,858 | Keulemans | Mar. 4, 1952 |
| 2,636,903 | Mertzweiller | Apr. 28, 1953 |
| 2,638,485 | Mertzweiller | May 12, 1953 |